United States Patent [19]

Allen

[11] 4,439,102

[45] Mar. 27, 1984

[54] MATERIAL HANDLING APPARATUS

[75] Inventor: Ralph E. Allen, Greene, N.Y.

[73] Assignee: The Raymond Corporation, Greene, N.Y.

[21] Appl. No.: 482,454

[22] Filed: Apr. 6, 1983

Related U.S. Application Data

[63] Continuation of Ser. No. 30,122, Apr. 16, 1979, abandoned.

[51] Int. Cl.[3] .......... B60P 1/34; B66F 9/14

[52] U.S. Cl. .......... 414/633; 414/631; 414/632

[58] Field of Search .......... 414/607, 630-638, 414/666, 667, 670, 671

[56] References Cited

U.S. PATENT DOCUMENTS

| | | | |
|---|---|---|---|
| 3,643,825 | 2/1972 | Zane, Jr. | 414/607 |
| 3,907,140 | 9/1975 | Jinks | 414/631 X |
| 3,937,346 | 2/1976 | van der Laan | 414/666 |
| 3,998,346 | 12/1976 | Gibson et al. | 414/666 |

FOREIGN PATENT DOCUMENTS

| | | | |
|---|---|---|---|
| 271633 | 4/1964 | Australia | 414/666 |

*Primary Examiner*—Jeffrey V. Nase
*Attorney, Agent, or Firm*—Richard G. Stephens

[57] ABSTRACT

Use of a laterally-shiftable C-shaped frame which supports an auxiliary mast above its upper and lower extremities allows a lift truck to handle wider loads in a given aisle width, and decreases bending moments and inertial forces.

6 Claims, 5 Drawing Figures

MATERIAL HANDLING APPARATUS

This invention is a continuation of my prior co-pending application Ser. No. 030,122 filed Apr. 16, 1979, now abandoned.

This invention relates to material handling apparatus, and more particularly to an improved mast arrangement for lift trucks having two separate vertical lifting mechanisms. In some applications it is desirable that an operator be raised and lowered along a mast to handle full pallet loads with forks, principally because the better visibility which such a procedure affords allows him to control storage and retrieval of such loads faster with greater safety and less damage to loads and racks than if he remained stationed at the base of the truck. Raising and lowering an operator compartment takes substantial energy due to the weight of such a compartment, and the weight and inertia it adds to a lifting system makes it difficult to make small, fine corrections in vertical positions. Battery energy can be conserved and fine control enhanced if small vertical adjustments can be made by use of an auxiliary lifting system rather than raising the operator compartment to make such adjustments. One object of the invention is to provide an auxiliary lifting system for a lift truck having an elevatable operator compartment or station.

In a truck which has an elevatable operator compartment and which is adapted to handle pallet-size loads, it is usually necessary or desirable that load forks be lowerable all the way to a floor to allow pallets to be picked up from the floor. If one fixedly mounts load forks near the bottom of the operator compartment, the highest elevation to which one can raise the forks then tends to be a distance below the ceiling equal to the height of the operator compartment. By provision of an auxiliary lifting mechanism which will raise and lower a fork carriage to vary fork level relative to the bottom and the top of an operator compartment, one can materially increase the volume of goods which can be stored in a given floor area, which is of important economic significance.

The broad idea of providing an auxiliary lifting mechanism on a truck having an elevatable operator compartment is not new. In the use of a class of trucks commonly called order-pickers, an operator is raised and lowered adjacent storage compartments in a storage rack so that he may readily reach from his position aboard the truck into a storage compartment either to retrieve an article, which he normally places on a pallet or the like carried by the truck, or to store an article, which he typically lifts from a pallet or bin or like aboard the truck. Operator convenience and efficiency are enhanced if the operator is within easy reach of both articles in a rack and the pallet or other on-board device where articles are carried, so that he does not have to bend over, for example, to retrieve or store a given article at a given storage compartment. While the operator may raise and lower his platform to put himself at a convenient vertical height relative to storage shelves or stored articles, his efficiency can be increased if an auxiliary vertical lifting mechanism can provide short fine adjustments in elevation of a pallet on a truck, and various means such as scissors mechanisms have been provided aboard some order picker trucks to allow small vertical adjustments of the pallet. However, when pallet-size loads are to be handled substantially greater weights must be handled by an auxiliary lifting mechanism. And importantly, handling efficiency is greatly increased when pallet-sized loads are handled, if the operator can service both sides of an aisle rapidly. Both sides can be serviced if the truck load carriage can be rotated 180 degrees about a vertical axis and laterally shifted. Thus another object of the invention is to provide an improved lifting mechanism having both an elevatable operator compartment and an auxiliary lifting mechanism which allows load forks to be rotated about a vertical axis and laterally shifted.

The broad idea of providing a mast which is rotatable about a vertical axis and also laterally shiftable is not in itself new, such an arrangement being shown in U.S. Pat. No. 3,904,140. The mast there shown is not an auxiliary mast, however, but the only mast used on a vehicle. In that device pivot connections behind the mast are carried on a pair of forwardly-extending arms spaced vertically apart. Large forces are applied to the arms when appreciable loads are carried, and large deflections tend to occur. The pivot connections behind the mast undesirably consume aisle width, decreasing the maximum width of loads which can be handled in an aisle of given width. In accordance with one concept of the present invention, it is recognized that because an auxiliary mast need only have limited height, such as a height approximating that of an operator compartment, it becomes feasible to support the mast in a C-shaped frame, wherein arms extend forwardly from a vertical member above and below the upper and lower extremities of the vertical mast. The vertical axis about which the mast pivots then coincides with the center of the mast instead of being behind the mast, and provision of the C-shaped frame does not decrease the width of loads which can be handled. Thus one object of the present invention is to provide a lift truck having an auxiliary mast which is laterally shiftable and pivotable about a vertical axis wherein the pivot construction does not decrease the width of loads which can be handled.

By locating the vertical pivot axis centrally above and below the mast, lesser bending moments occur when a load is pivoted, and thus another object of the invention is to provide an improved rotatable mast which experiences lesser bending moments for a given load.

By locating the vertical pivot axis centrally above and below the mast, the center-of-gravity of a load can be closer to that axis, resulting in substantially less load inertia, and consequently requiring less power and less powerful mechanism to start and stop rotation about the vertical axis and less stress on the rotating mechanism. Thus another object of the invention is to provide an improved rotatable mast which allows the load center-of-gravity to lie closer to the vertical axis of rotation.

When an operator compartment, a side-shifting carriage, and a fork rotating mechanism are supported seriatim on a main mast, each such device tends to contribute some deflection, with the result that the auxiliary mast tends to deflect top forwardly relative to the bottom, forwardly being the direction in which the forks are pointing. When an auxiliary mast is so deflected, if it is shifted far enough toward a storage rack to place a load completely within a desired storage compartment, the top of the auxiliary mast can extend somewhat into an upper compartment and damage a load stored there. Even if there is no load stored in the upper compartment, the mentioned deflection can complicate and slow down material handling operations. Lateral shifting of the mast toward a storage rack is limited to a point where an upper portion of a deflected mast engages a shelf or rack beam, tending to prevent one from depositing a load as far into a rack as may be desired, and in such a case an operator may have to perform a "double bite" procedure which involves setting the load down, slightly retracting the forks, re-lifting the load with it sitting further toward the tips of the forks, re-extending the forks, and then lowering the load. These disadvantages can be overcome by use of a small auxiliary mast which is tiltable as well as rotatable about a vertical axis and laterally shiftable. Such an auxiliary mast is described and claimed in application Ser. No. 030,082 filed on Apr. 16, 1979 and now U.S. Pat. No. 4,236,862. The present invention will be illustrated in connection with a tiltable mast of the type shown in U.S. Pat. No. 4,236,862. It is to be understood, however, that the present invention does not require use of a tiltable mast.

Other objects of the invention will in part be obvious and will, in part, appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 3:
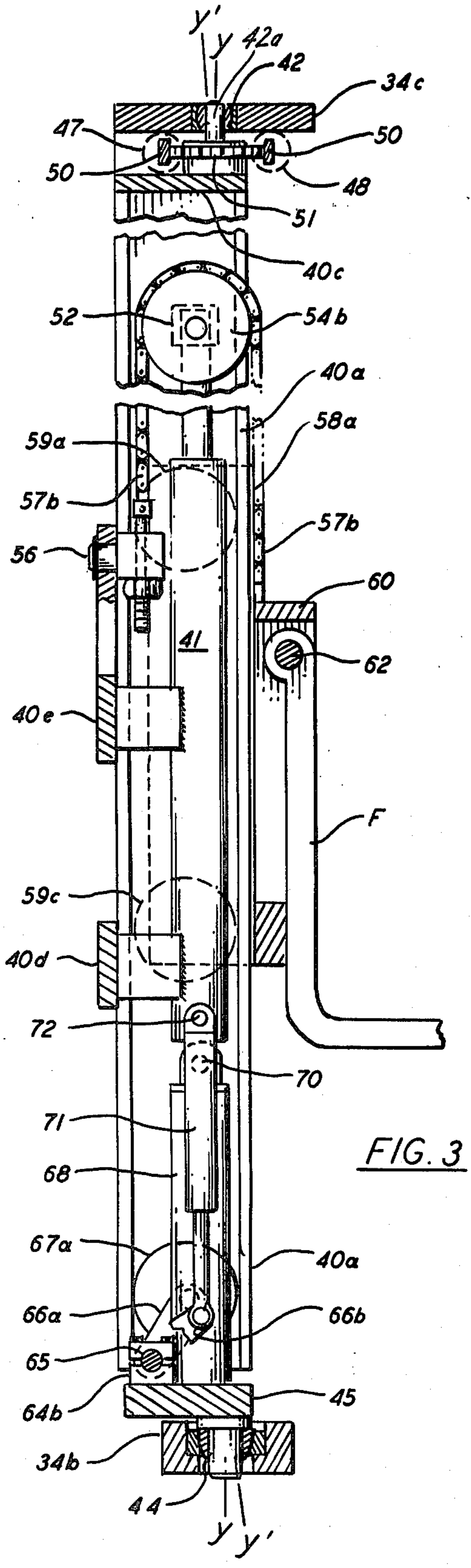
FIG. 3 is a semi-diagrammatic cross-section view taken at lines 3—3 in FIG. 2 with certain parts cutaway or omitted and certain parts added for sake of clarity.
Figure 3A:
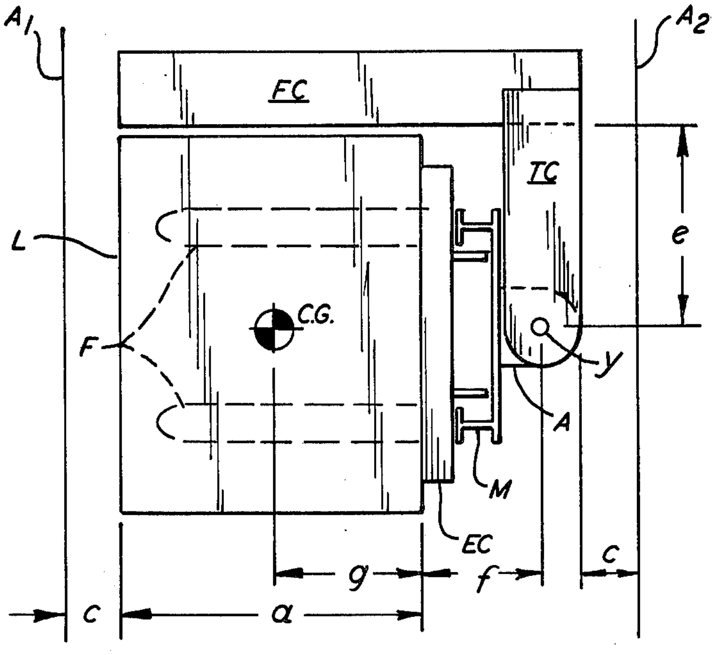
FIG. 3a Prior Art
Figure 3B:
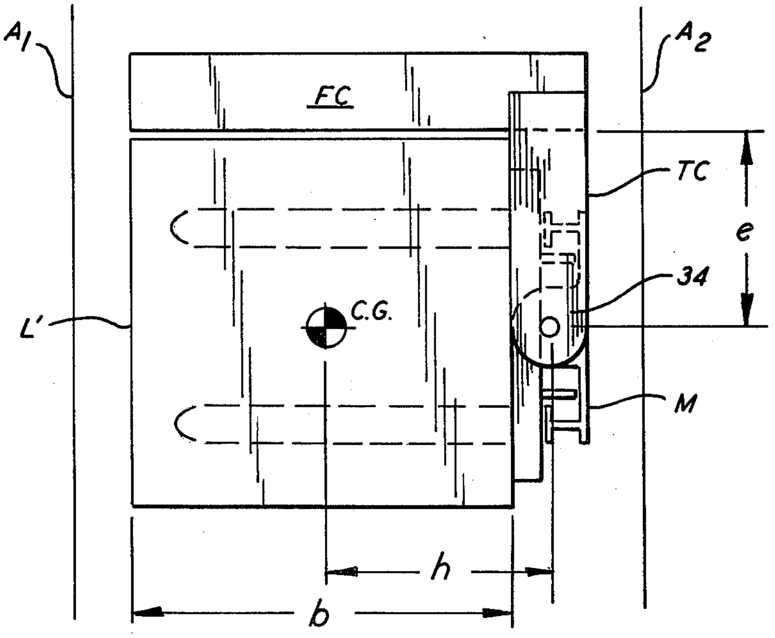

FIG. 3*a* is a diagrammatic plan view of a prior art vehicle and FIG. 3*b* is a diagrammatic plan view of a vehicle constructed according to the invention.

Figure 1:
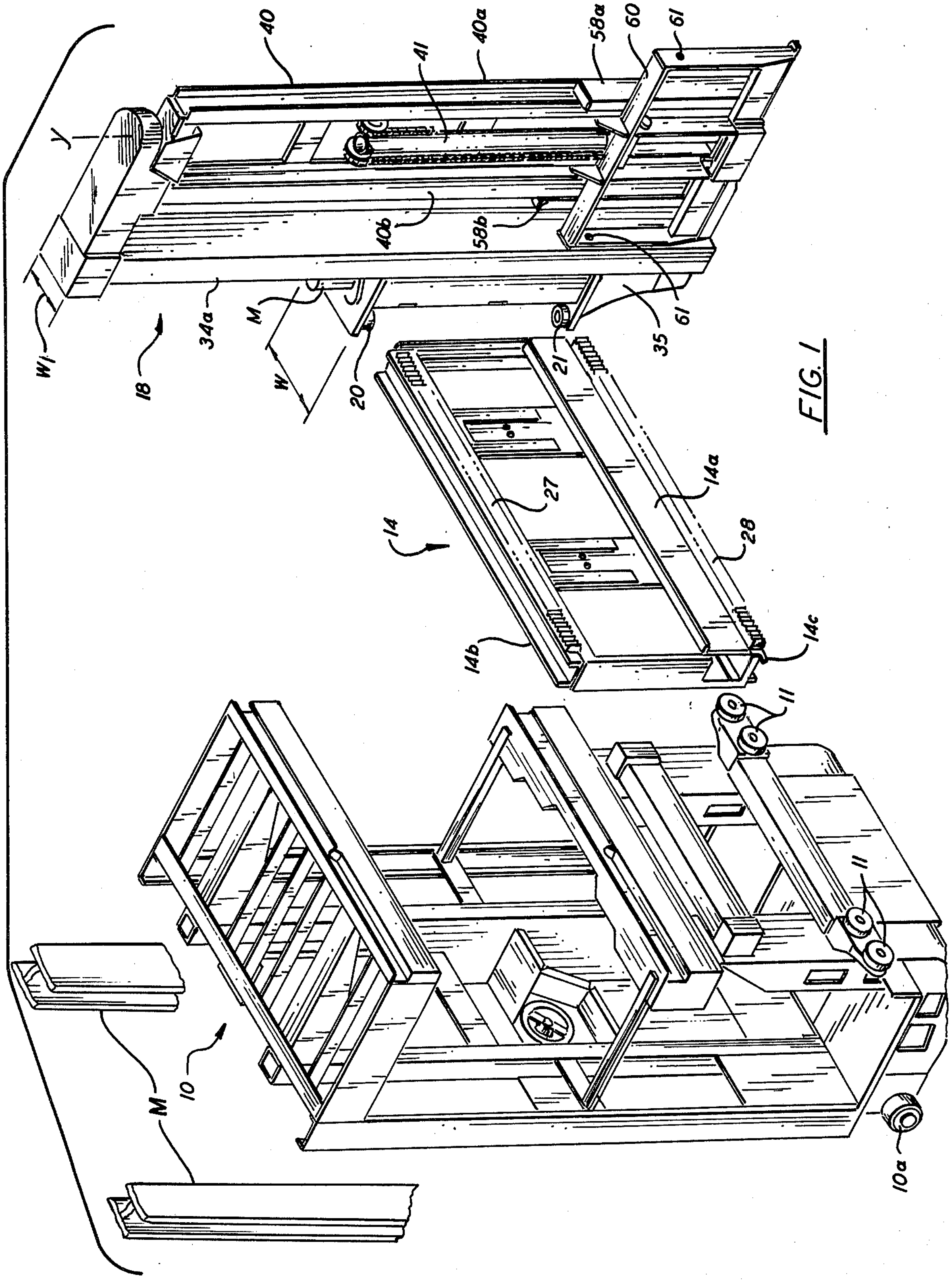
FIG. 1 is an exploded isometric view illustrating an operator compartment, an intermediate carriage and a load handler utilized in one form of truck according to the invention.

In FIG. 1 three major portions of one form of truck incorporating the present invention are shown in an exploded arrangement. An operator compartment 10 shown at the left is carried on a conventional main mast shown diagrammatically at M and raised and lowered along the main mast M in conventional fashion, with rollers such as roller 10*a* nesting between flanges of the main mast vertical members.

Intermediate carriage 14 is mounted on the forward side of the operator compartment structure and laterally shiftable relative thereto a short distance, typically of the order of 6 to 9 inches (15.24 to 22.86 cm.). Rollers 11,11 on the compartment structure 10 ride in a channel 14*a* portion of the intermediate carriage. Further rollers journalled on a structure 10 which are rotatable about vertical axes nest in the recess between lower flanges of an upper I-shape member 14*b* and in the recess between upper flanges of a lower I-shape member 14*c* of the intermediate carriage to support the intermediate carriage on the operator compartment structure and allow relative lateral movement. A hydraulic ram (not shown) is connected between the structure 10 and the intermediate carriage to move the latter laterally. The intermediate carriage may incorporate various features of an improved carriage construction shown in commonly-assigned application Ser. No. 029,780 filed on Apr. 13, 1979 by Christian D. Gibson, and now abandoned.

Figure 2:
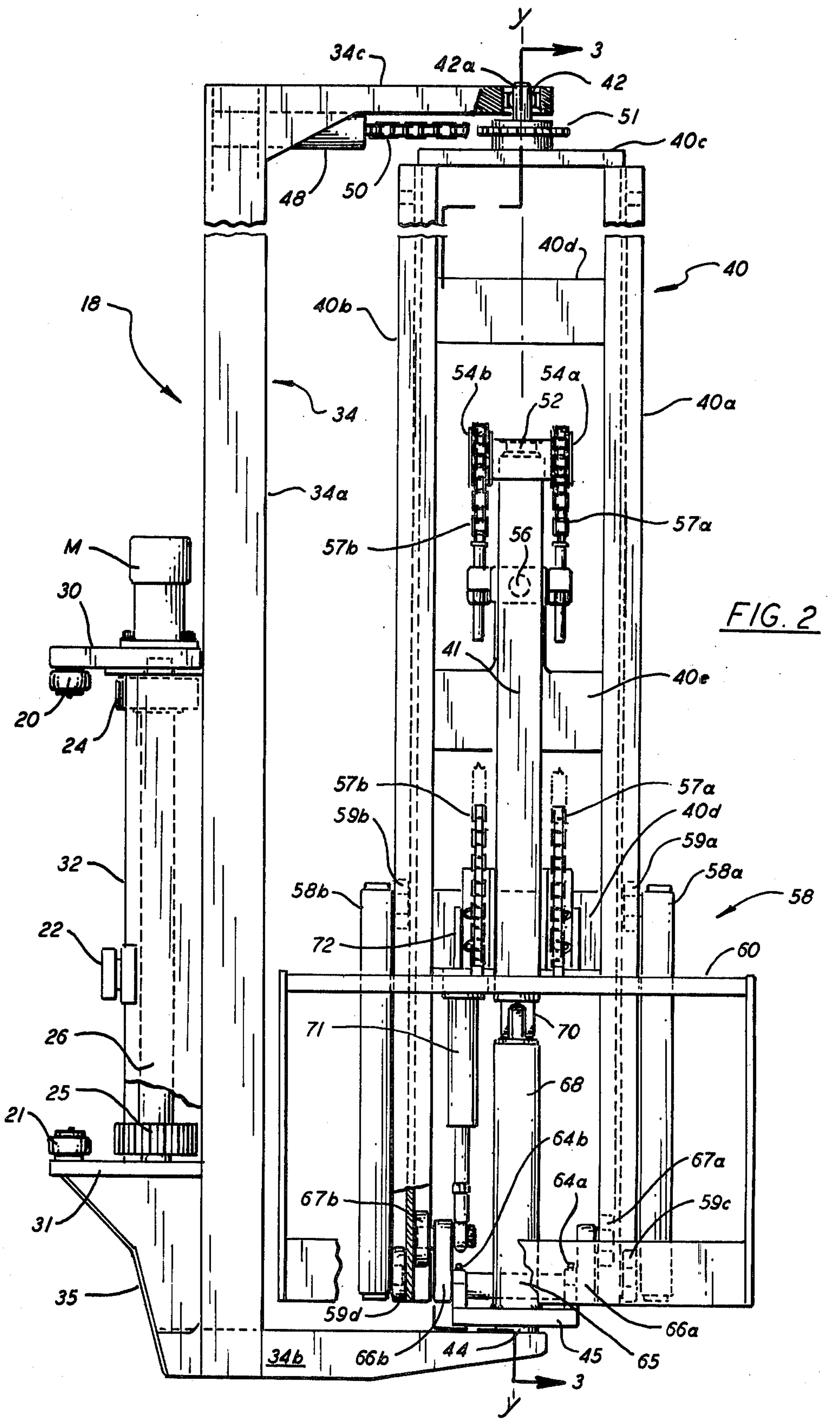
FIG. 2 is a side elevation view of the load handler shown in FIG. 1.

A load handler assembly 18 which includes the improved rotatable mast arrangement of the present invention, and which is also illustrated in FIGS. 2 and 3 is carried on the forward face of intermediate carriage 14. Upper and lower roller pairs 20,21 journalled on the load handler nest in the upper recess between flanges of I-member 14*b* and in the lower recess between flanges of I-member 14*c* to suspend the load handler on the intermediate carriage. Roller 22 (FIG. 2) on the rear side of the load handler rides atop channel 14*a* to transmit vertical force to the intermediate carriage. Pinions 24,25 interconnected by shaft 26 journalled on the load handler engage respective racks 27,28 on the intermediate carriage, with the result that lateral load moments applied to the load handler are converted to pure translational forces on the racks, allowing the load handler to have very modest width (dimension w in FIG. 1). Traverse motor M rotates shaft 26 and pinions 24,25 to move the load handler back and forth across the face of the intermediate carriage. The rack and pinion arrangement is not novel per se, a similar arrangement being shown in U.S. Pat. No. 3,998,346.

The roller pairs 20,21 and roller 22 which support the load handler on the intermediate carriage are journalled on an upper plate 30, a lower plate 31 and a pair of plates (e.g. 32) all carried on the rear side of a C-shaped frame 34 formed by a vertically-extending box section member 34*a*, a heavy lower support arm 34*b*, and an upper support arm 34*c*. Lower support arm 34*b*, which supports the entire vertical load weight, is preferably a solid bar which extends through and is welded to the lower end of box section member 34*a*. Rear bracket 35 serves to stiffen the lower end of the C-shaped frame. Significantly, the upper and lower arms 34*c*,34*b* of the C-shaped frame extend above and below the upper and lower extremities of the rotatable auxiliary mast 40, situating the vertical axis of rotation y—y of the mast substantially at the center of the mast, as viewed in two mutually-perpendicular horizontal directions. The arrangement shown will be seen to readily allow the auxiliary mast 40 to be rotated about axis y—y through the angle of 180° required for servicing both sides of an aisle.

The auxiliary mast 40 is shown as comprising a pair of spaced-apart I-shape members 40*a*,40*b* interconnected by an upper tie plate 40*c*, upper and lower cross tie members 40*d*,40*d*, and a cross-tie member 40*e*. The cylinder of auxiliary lift ram 41 is fastened to lower cross-tie member 40*d* and member 40*e*. An upper ball joint 42 pivotally and slidingly interconnects upper tie plate 40*c* of the mast to upper arm 34*c* of the C-shaped frame, and a lower ball joint bearing 44 pivotally interconnects a lower base plate 45 of the mast and lower arm 34*b* of the C-shaped frame. A pair of hydraulic rams 47,48 mounted at the top of the C-shaped frame connect to the ends of a length of chain 50 extending around sprocket 51 on upper tie plate 40*c*, so that extension of one ram and retraction of the other rotates mast 40 about vertical axis y—y.

The cylinder of lift ram 41 is fixedly connected to mast members 40*a*,40*b* as previously mentioned. The end of its extendable arm carries a crosshead member 52 on which pulleys 54*a*,54*b* are journalled. A tension equalizer lever 56 pivotally mounted on the lift cylinder holds one end of each of lift chains 57*a*,57*b*, which extend over pulleys 54*a*,54*b* respectively and are anchored at the top of auxiliary carriage 58. Carriage 58 comprises a pair of vertically-extending rigid members **58*a*,58*b* each carrying a respective pair of rollers 59*a*–59*d*, rollers 59*a* and 59*c* journalled at the upper and lower ends of member 58*a* nesting between outer flanges of mast member 40*a*, and rollers 59*b* and 59*d* at the upper and lower ends of carriage member 58*b* nesting between outer flanges of mast member 40*b*. As best seen in FIG. 1, a rigid frame 60 welded to members 58*a*,58*b* is adapted to carry load forks F,F on a bar 62 (FIG. 3) which passes through holes 61,61 (FIG. 1) in frame 60**.

The vertical load on carriage 60 plus the weight of the auxiliary mast members and carriage is applied via pivot or knee joint 70 (FIG. 2) and post 68 to base plate 45, and thence via bearing 44 to lower arm **34*b* of the C-shaped frame. It will be apparent that extension and retraction of lift ram 41 raises and lowers carriage 58 up and down auxiliary mast 40** at double the speed of the ram.

It is important to note in connection with the present invention that the width dimension $w_1$ in FIG. 1 of the C-shaped frame can be as great as dimension w without limiting the maximum width load which can be carried on the carriage.

FIG. **3*a* diagrammatically illustrates a truck using the mentioned prior art technique for mounting a mast for rotation through 180 degrees about a vertical axis. A vertically fixed carriage FC supports a traverse carriage TC which is laterally shiftable across the face of the fixed carriage. A pair of arms A extend to the traverse carriage from the rear side of a mast M, the arms being pivotable about a vertical axis at y. The mast supports an elevatable carriage EC carrying load forks F,F on which a load L is shown. Lines $A_1$ and $A_2$ represent the sides of a warehouse aisle. With the traverse carriage translated to one side of the fixed carriage as shown, it will be seen that the maximum dimension which load L may have in the aisle width direction is shown by a, assuming a small clearance c is required for safety's sake. Further, assume the traverse carriage is driven leftwardly, while arms A are rotated counterclockwise to swing the forks through and past a mid-position where they would point downwardly as viewed in FIG. 3*a***. When the forks are at the mentioned mid-position, the center-of-gravity of load L will lie a distance from the fixed carriage equal to the sum of the dimensions e,f and g. The longitudinal bending moments applied to the structures shown then will be directly proportional to the quantity (e+f+g), and the inertia then will be proportional to $(e+f+g)^2$.

Referring now to FIG. **3*b* representative of the present invention, wherein C-shaped frame 34 supports the mast M above and below the mast, substantially centrally of the mast in the aisle width direction as well as the direction perpendicular thereto, the mast M occupies aisle width space also occupied by the traverse carriage, and thus load L' in FIG. 3*b* may have a substantially greater dimension b. Dimension b in FIG. 3*b* will be seen to exceed dimension a in FIG. 3*a* substantially by amount f. If traverse carriage TC has a width which allows a portion of the fork carriage to fit within its width, dimension b may exceed dimension a by even more than the distance f. If the load L of FIG. 3*a* is placed on the forks of the improved truck of FIG. 3*b*, and the forks then rotated to a mid-position pointing downwardly in FIG. 3*b*, the center-of-gravity of load L will lie a distance from carriage FC which is approximately equal to (e+h). Thus bending moments will be proportional to the quantity (e+h), which can be much smaller than (e+f+g), and inertial force required to start and stop pivoting of the load will be proportional to $(e+h)^2$, rather than the larger quantity $(e+f+g)^2$ characteristic of the prior art. In FIG. 3*b*** wherein the present invention is utilized, it will be seen that by locating the vertical axis y—y substantially centrally on the mast, rather than behind the mast, the C-shaped mast mounting frame can be laterally co-extensive with the traverse mechanism, not consuming added aisle width and hence a load of greater width can be handled, which is an important feature of the invention.

Lower base plate 45 (FIG. 2) of the auxiliary mast is shown carrying a pair of bearing blocks **64*a*,64*b* in which shaft 65 is journalled. A crank arm 66*a* on one end of shaft 65 carries roller 67*a* which is nested between the inner flanges of mast member 40*a*. A similar crank arm 66*b* on the other end of shaft 65 carries roller 67*b* which is nested between the inner flanges of mast member 40*b*. Crank arms 66*a* and 66*b* have the same length and extend from shaft 65 at the same angle. A heavy post 68 having its lower end fixedly mounted on base plate 45 is pivotally connected at its upper end to the auxiliary mast members via a knee joint 70 shown provided on the lower end of auxiliary lift ram 41. The upper end of a double-acting tilt ram 71 is pivotally mounted at 72 on cross-tie member 40*d* of the mast, and the end of its extensible arm is pivotally connected to crank arm 66*b*, preferably nearer to shaft 65 than the connection of roller 67*b* to arm 66*b*. With tilt ram 71 in its retracted position shown in FIG. 3, the auxiliary mast members 40*a*,40*b* extend vertically, parallel to axis y—y. As the tilt ram is extended crank arm 66*b* rotates shaft 65 clockwise as viewed in FIG. 3, so that crank arms 66*a* and 66*b* swing rollers 67*a*,67*b* rightwardly and slightly downwardly, thereby pushing the lower end of the mast rightwardly relative to base plate 45 and spherical bearing 44. Connection of ram 71 to arm 66*b* at a lesser radial distance from shaft 65 than rollers 67*a*,67*b* allows a short ram stroke to provide greater forward translation of the bottom of the mast. As the lower end of the mast members are moved rightwardly or forwardly, with the upper end of the mast pivoting at bearing 42**, it will be apparent that the mast experiences a backward tilting, which can compensate for or cancel a top-forward tilting which deflections in the main mast, operator compartment and intermediate carriage may contribute. In a typical application tilting through a range of 0 to 3 degrees is deemed suitable, although the amount of reverse tilt required will vary in different applications.

As the lower ends of mast members **40*a*,40*b* move rightwardly, base plate 45 and upper tie plate 40*c* also tilt slightly, so small clearance spaces are provided between these plates and the arms of the C-shaped frame. Provision of bearings 42 and 44 at the top and bottom of the auxiliary mast capable of two-dimensional rotation allows plates 45 and 40*c* to rotate slightly relative to the lower and upper arms of the C-shaped frame, about horizontal axes, as well as allowing rotation of the mast about vertical axis y—y. Further, when tilt ram 71 has been extended, it is not necessary to retract that ram and return the mast to a vertical position before swinging a load from one side of an aisle to the other side, since even when the auxiliary mast is tilted, the two-dimensional bearings allow rotation of the tilted mast about axis y—y even when it is tilted to extend along a slightly non-vertical axis, such as axis y'—y' in FIG. 3. As the mast is tilted from a vertical position, it will be appreciated that the shaft 42***a* of the upper bearing 42 slides very slightly downwardly, and hence that upper arm 34*c* of the C-shaped frame does not experience appreciable vertical loading. Inasmuch as lower spherical bearing 44 transmits all the vertical weight to the C-shaped frame, it ordinarily will use a much heavier two-dimensional bearing than that used at 42, and arm 34*b* will employ much heavier construction than arm 34*c*.

While the present invention has been illustrated using the improved form of tiltable and rotatable mast described and claimed in the McCormick patent, it will be apparent that the present invention is readily applicable to vehicles having a rotatable mast which is not tiltable, in which case cylindrical bearings could be used, of course, in lieu of the two spherical bearings.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A mast assembly for a lift truck, comprising, in combination: a first mast; a compartment adapted to carry an operator, said compartment being suspended from said first mast, with said first mast on a first side of said compartment, means for raising and lowering of said compartment along said first mast; a generally C-shaped frame having a vertical member and upper and lower arm members extending from the vertical extremities of said vertical member; traverse means for suspending said vertical member of said frame on said operator compartment on a second side of said operator compartment opposite from said first side with said arm members extending away from said second side of said compartment, and for moving said frame horizontally back and forth across said second side of said operator compartment; a second mast confined vertically in between said upper and lower arm members of said frame and pivotally connected to said arm members for rotation about a substantially vertical axis; means for tilting said second mast; a load carriage guided for vertical movement along said second mast; and lifting means carried on said second mast for raising and lowering said load carriage along said second mast relative to said compartment and said first mast.

2. The assembly according to claim 1 wherein said second mast comprises a pair of vertically-extending members spaced apart from each other in a first horizontal direction at equal distances on opposite sides of said axis.

3. The assembly according to claim 1 wherein said second mast is pivotally connected to said arm members adjacent to but inside the outer extremities of said arm members.

4. The assembly according to claim 1 wherein said second mast comprises a pair of vertically-extending mast members spaced apart from each other in a first horizontal direction, each of said mast members having a pair of flanges spaced apart from each other in a second horizontal direction perpendicular to said first direction, wherein said load carriage includes a plurality of rollers nested between respective pairs of said flanges, and said axis is situated in between the flanges of said pairs in said second horizontal direction.

5. The assembly according to claim 1 wherein the widths of the members of said C-shaped frame measured in the direction of travel of said traverse means do not exceed the maximum width of said traverse means measured in said direction of travel.

6. The assembly according to claim 1 wherein said upper and lower arm members of said C-shaped frame extend from a first side of said vertical member of said C-shaped frame to pivotally support said second mast, and wherein said traverse means comprises roller means mounted on a second side of said vertical member opposite from said first side, said roller means suspending said frame on said second side of said operator compartment.

* * * * *